(12) United States Patent
Kato et al.

(10) Patent No.: US 7,411,746 B2
(45) Date of Patent: Aug. 12, 2008

(54) WIDE-ANGLE LENS SYSTEM

(75) Inventors: Koji Kato, Saitama (JP); Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/677,713

(22) Filed: Feb. 22, 2007

(65) Prior Publication Data

US 2007/0201141 A1    Aug. 30, 2007

(30) Foreign Application Priority Data

Feb. 24, 2006 (JP) ............................. 2006-047933
Feb. 24, 2006 (JP) ............................. 2006-047942

(51) Int. Cl.
*G02B 15/14* (2006.01)
(52) U.S. Cl. ..................... 359/770; 359/793
(58) Field of Classification Search ................ 359/680, 359/676, 686, 689, 691
See application file for complete search history.

(56) References Cited

U.S. PATENT DOCUMENTS 5,805,349 A    9/1998    Sato (Continued)

FOREIGN PATENT DOCUMENTS

| JP | 6-160706 | 6/1994 |
|---|---|---|
| JP | 9-113800 | 5/1997 |
| JP | 2001-013405 | 1/2001 |
| JP | 2001-330771 | 11/2001 |
| JP | 2002-303790 | 10/2002 |
| JP | 2003-121735 | 4/2003 |

OTHER PUBLICATIONS

English Language Abstract of JP 6-160706.
English Language Abstract of JP 9-113800.
English Language Abstract of JP 2001-013405.
English Language Abstract of JP 2001-330771.
English Language Abstract of JP 2002-303790.
English Language Abstract of JP 2003-121735.
U.S. Appl. No. 11/677,682 to Kato, which was filed on Feb. 22, 2007.

*Primary Examiner*—Timothy J Thompson
(74) *Attorney, Agent, or Firm*—Greenblum & Bernstein, P.L.C.

(57) ABSTRACT

A wide-angle lens system includes a negative front lens group and a positive rear lens group, in this order from the object.

The negative front lens group includes a negative first sub-lens group and a positive second sub-lens group, in this order from the object.

The positive rear lens group includes cemented lens elements having a positive lens element, a negative lens element and a positive lens element.

The wide-angle lens system satisfies the following conditions:

$$-0.8 < f1a/f1b < -0.2 \qquad (1)$$

$$0.7 < f/fR < 1.1 \qquad (2)$$

wherein
f1a designates the focal length of the negative first sub-lens group;
f1b designates the focal length of the positive second sub-lens group;
f designates the focal length of the entire wide-angle lens system; and
fR designates the focal length of the positive rear lens group.

22 Claims, 10 Drawing Sheets

U.S. PATENT DOCUMENTS

| | | |
|---|---|---|
| 6,710,942 B2 | 3/2004 | Sato |
| 6,924,947 B2 | 8/2005 | Saori |
| 7,061,685 B2 * | 6/2006 | Itoh ........................... 359/682 |
| 7,106,520 B2 | 9/2006 | Saori |
| 7,139,132 B2 * | 11/2006 | Itoh ........................... 359/691 |
| 7,253,966 B2 * | 8/2007 | Saori ........................... 359/691 |
| 2007/0002456 A1 | 1/2007 | Saori |
| 2007/0002457 A1 | 1/2007 | Saori |
| 2007/0002458 A1 | 1/2007 | Saori |

* cited by examiner

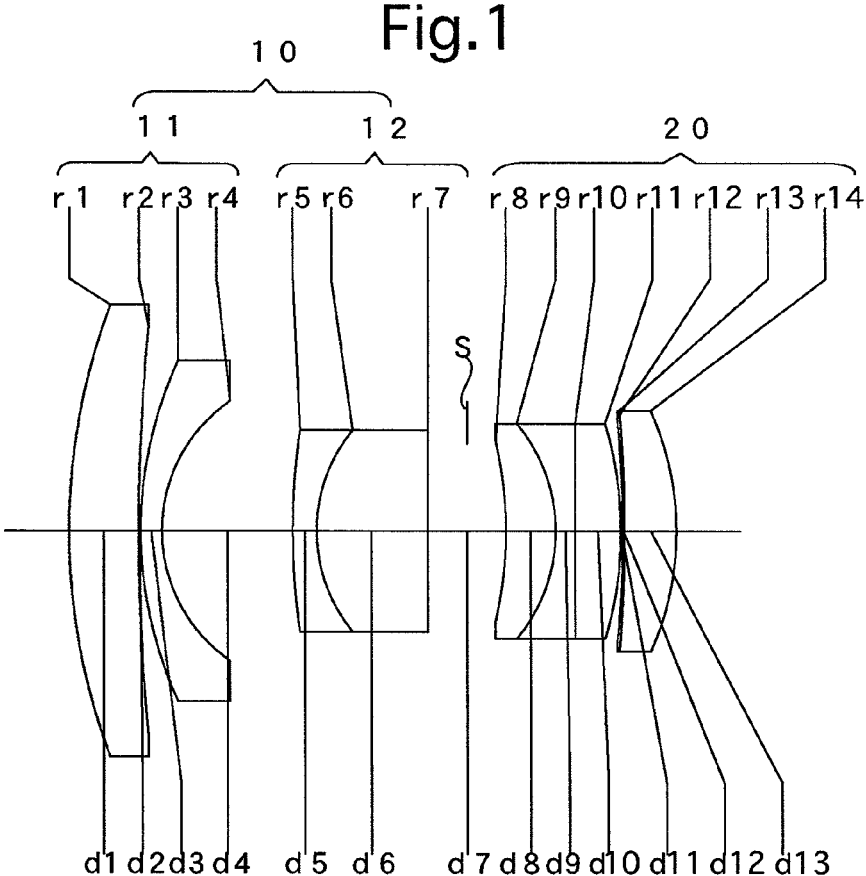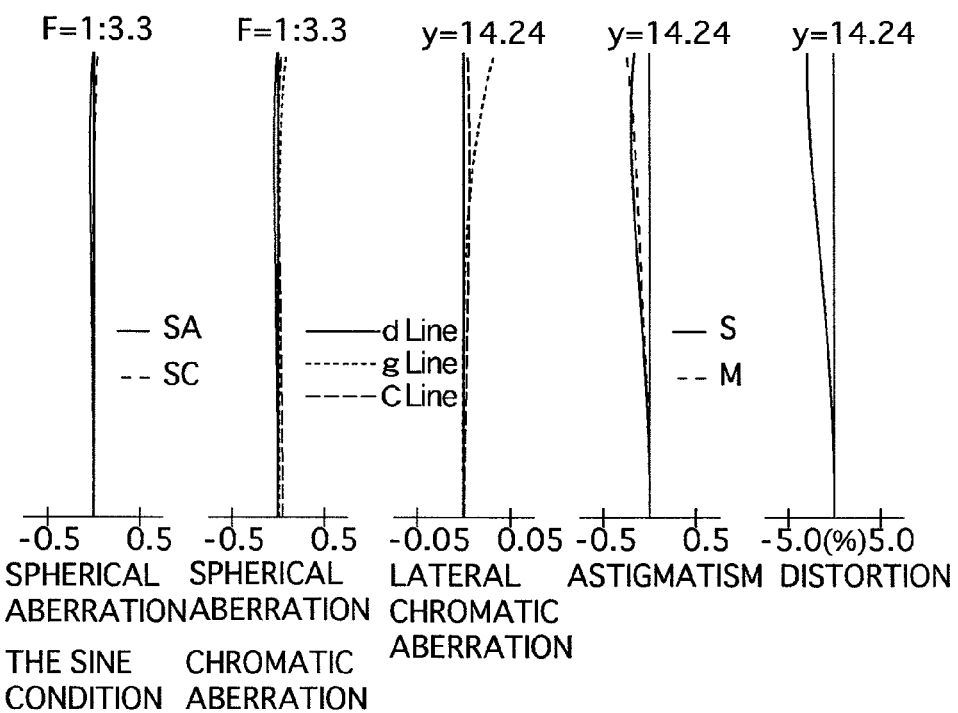

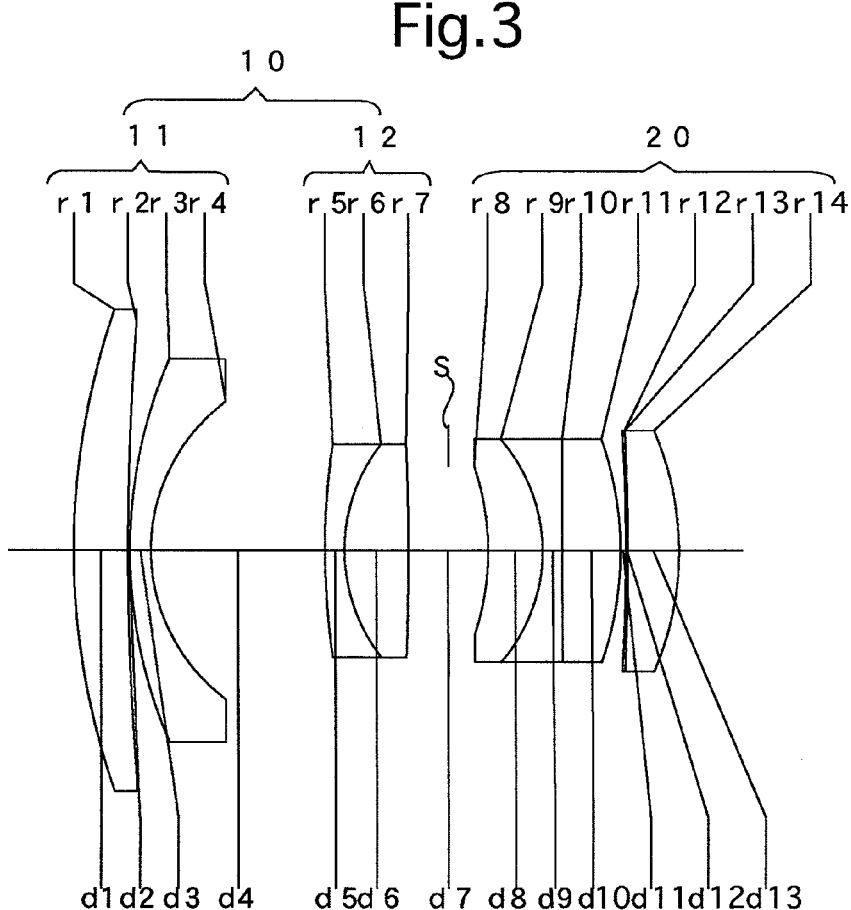
Fig.3
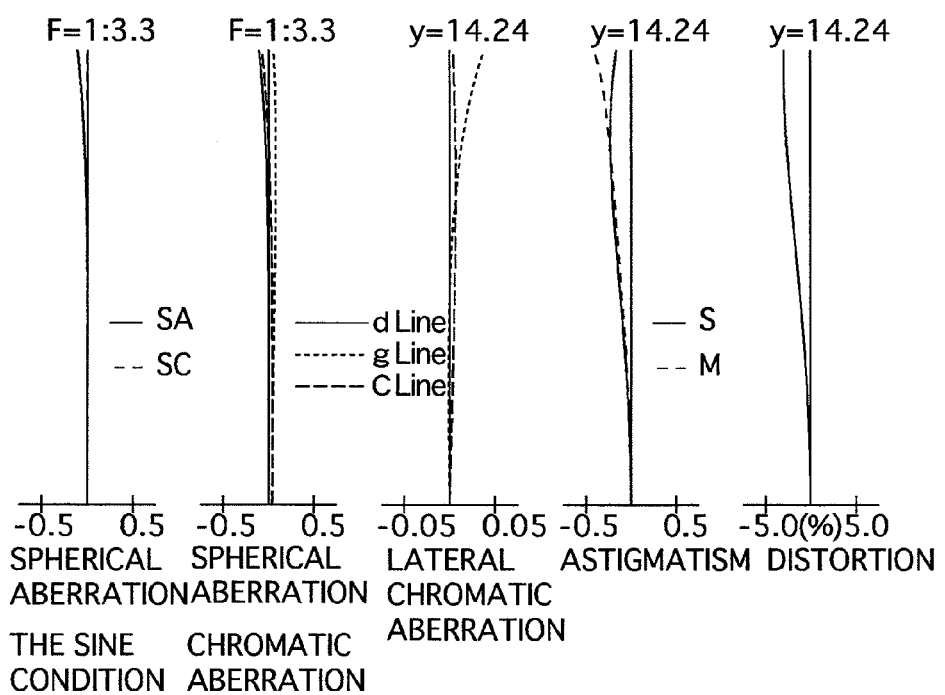

Fig.5
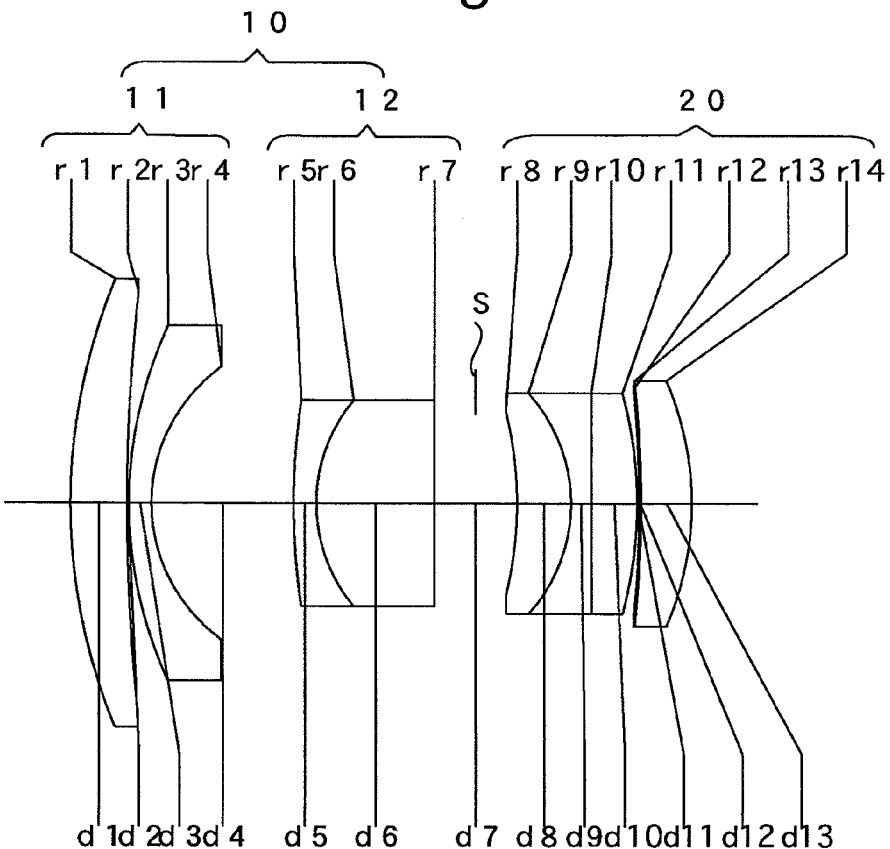
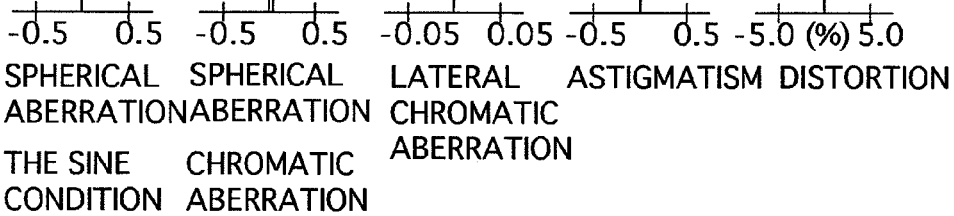

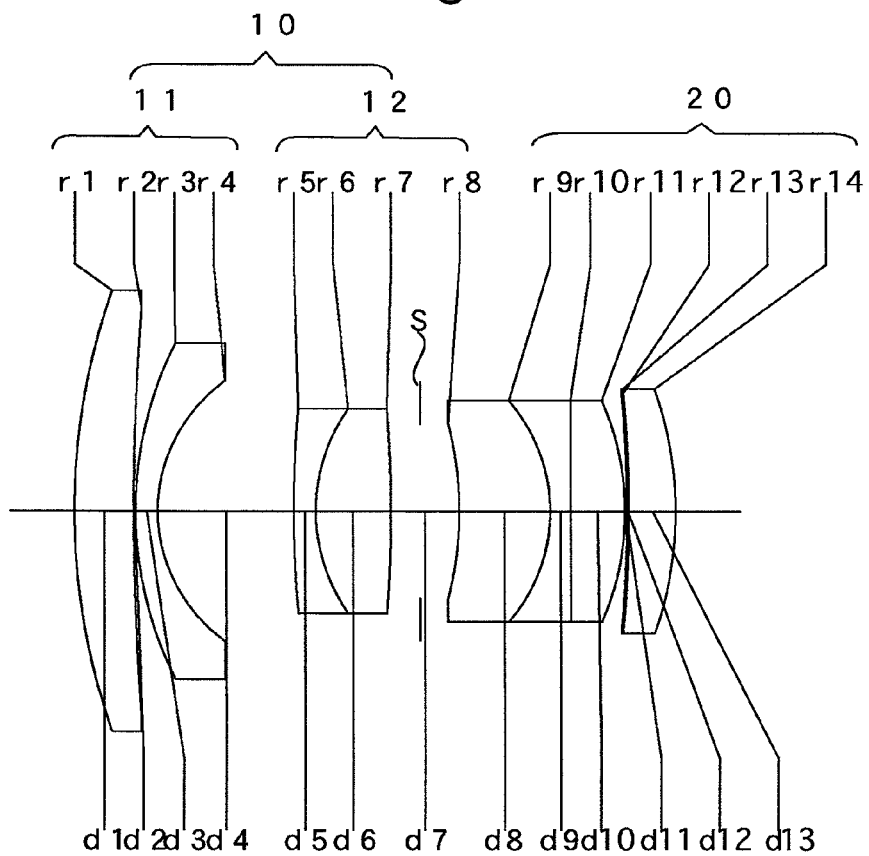

Fig.9
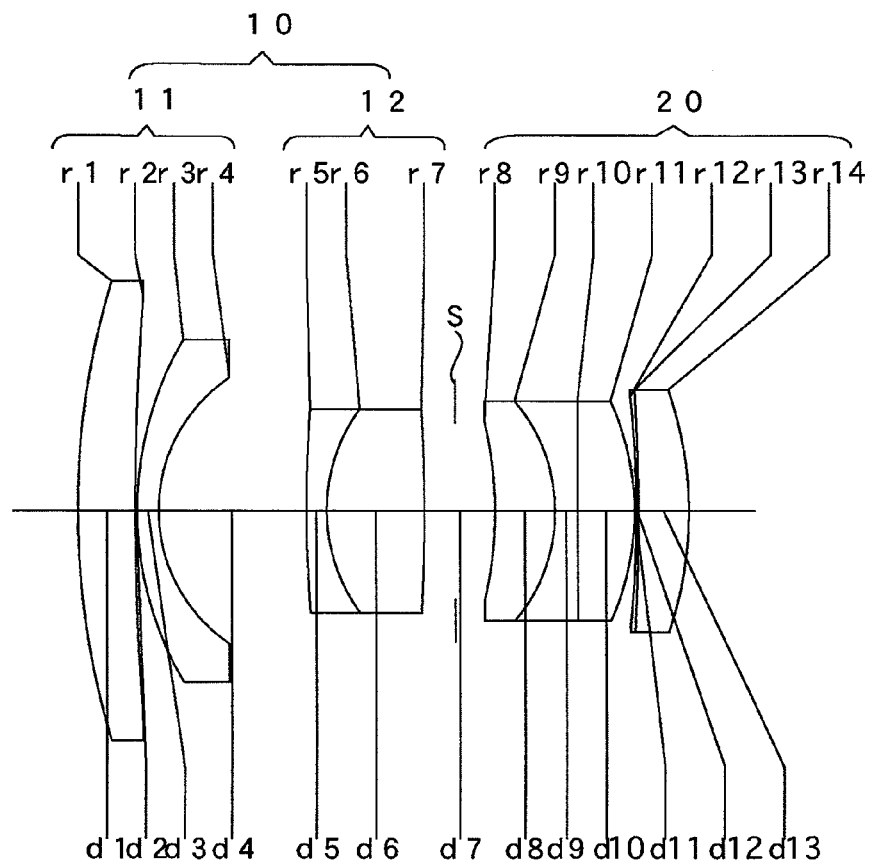
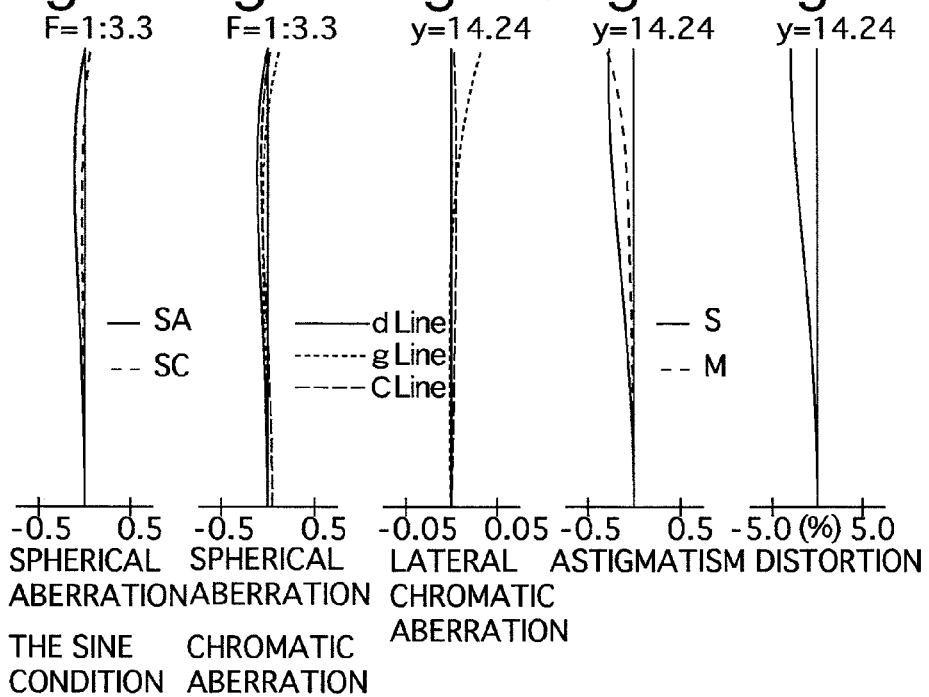

Fig. 13
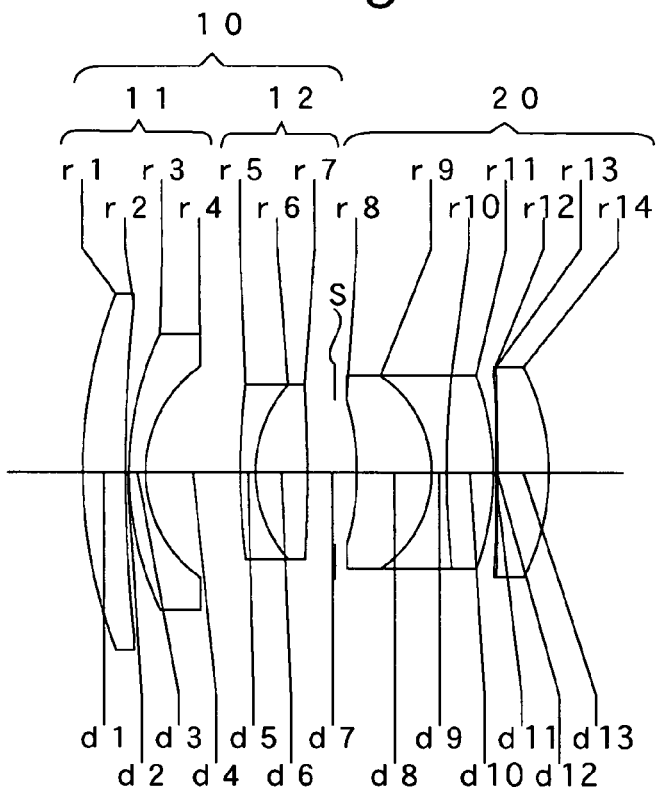
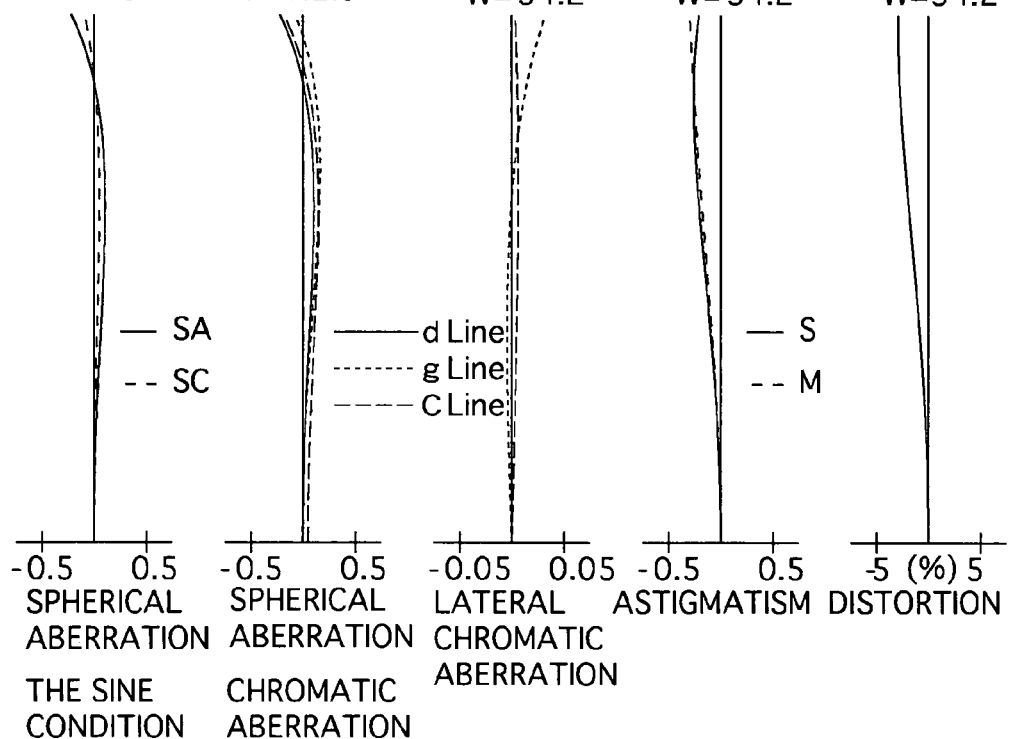
Fig.14A  Fig.14B  Fig.14C  Fig.14D  Fig.14E

Fig. 17
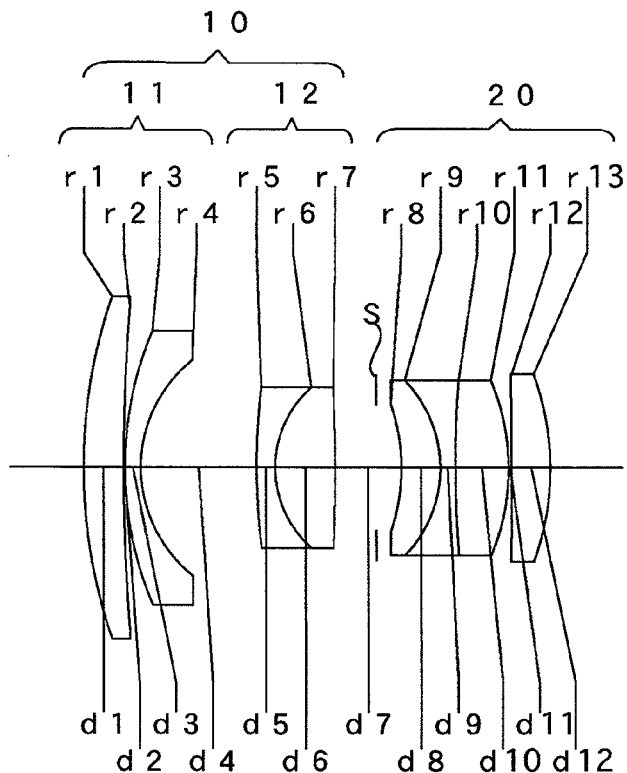
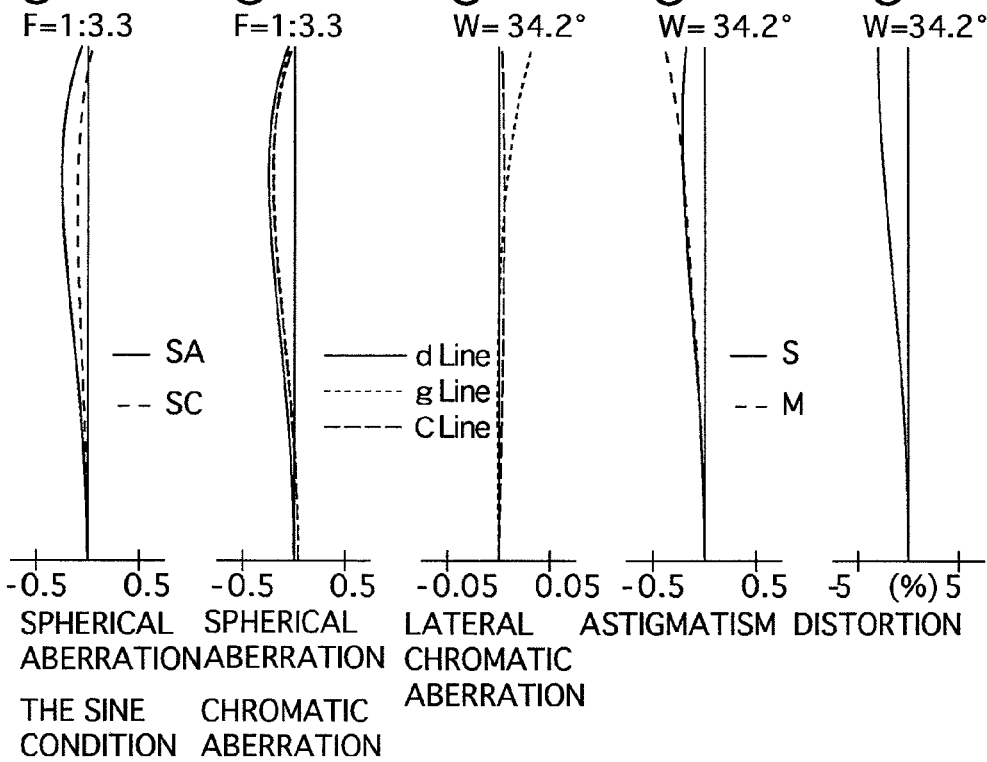
Fig.18A    Fig.18B    Fig.18C    Fig.18D    Fig.18E
F=1:3.3    F=1:3.3    W=34.2°    W=34.2°    W=34.2°
— SA          — d Line          — S
-- SC         ------- g Line    -- M
              ---- C Line
-0.5  0.5   -0.5  0.5   -0.05  0.05   -0.5  0.5   -5 (%) 5
SPHERICAL   SPHERICAL   LATERAL       ASTIGMATISM  DISTORTION
ABERRATION  ABERRATION  CHROMATIC
THE SINE    CHROMATIC   ABERRATION
CONDITION   ABERRATION

WIDE-ANGLE LENS SYSTEM

BACKGROUND OF THE INVENTION

1. Field of the Invention

The present invention relates to a wide-angle lens system suitable for a digital single-lens reflex (SLR) camera.

2. Description of the Prior Art

Retrofocus lens systems having a negative lens group and a positive lens group, in this order from the object, have been widely employed as wide-angle lens systems for single-lens reflex cameras which require a relatively long back focal distance with respect to the focal length. Various retrofocus lens systems have been proposed in regard to optical power distribution, lens arrangement and the size arrangement, etc., as shown in, e.g., the following Japanese Unexamined Patent Publications (hereinafter, JUPP):

JUPP No.H06-160706, JUPP No.H09-113800,
JUPP No.2001-13405, JUPP No.2001-330771,
JUPP No.2002-303790 and JUPP No. 2003-121735.

SUMMARY OF THE INVENTION

The present invention provides a high quality retrofocus wide-angle lens system with the following features:

(i) being thin (miniaturized) in the optical axis direction;

(ii) aberrations, specifically coma, distortion and chromatic aberration, are suitably corrected; and (iii) achieving an angle-of-view of approximately 70°.

According to a first aspect of the present invention, there is provided a wide-angle lens system including a front lens group having a negative refractive power (hereinafter, a negative front lens group), a diaphragm and a rear lens group having a positive refractive power (hereinafter, a positive rear lens group), in this order from the object.

The negative front lens group includes a negative first sub-lens group and a positive second sub-lens group, in this order from the object.

The positive rear lens group includes cemented lens elements having a positive lens element, a negative lens element and a positive lens element.

The wide-angle lens system satisfies the following conditions:

$$-0.8 < fla/flb < -0.2 \quad (1)$$

$$0.7 < f/fR < 1.1 \quad (2)$$

wherein fla designates the focal length of the negative first sub-lens group;

flb designates the focal length of the positive second sub-lens group;

f designates the focal length of the entire wide-angle lens system; and fR designates the focal length of the positive rear lens group.

Preferably, the above wide-angle lens system further satisfies the following condition:

$$0.1 < d/f < 0.3 \quad (3)$$

wherein d designates the axial distance between the negative front lens group and the positive rear lens group; and f designates the focal length of the entire wide-angle lens system.

According to a second aspect of the present invention, there is provided a wide-angle lens system including a negative front lens group, a diaphragm and a positive rear lens group, in this order from an object.

The negative front lens group includes a negative first sub-lens group and a positive second sub-lens group, in this order from the object.

The positive rear lens group includes cemented lens elements having a positive lens element, a negative lens element and a positive lens element.

The wide-angle lens system satisfies the following conditions:

$$-0.8 < fla/flb < -0.2 \quad (1)$$

$$0.1 < d/f < 0.3 \quad (3)$$

wherein fla designates the focal length of the negative first sub-lens group;

flb designates the focal length of the positive second sub-lens group;

d designates the axial distance between the negative front lens group and the positive rear lens group; and f designates the focal length of the entire wide-angle lens system.

In the first and aspects of the present invention, it is preferable that in the positive rear lens group, the positive lens element, the negative lens element and the positive lens elements of the cemented lens elements are arranged in this order from the diaphragm. It is also preferable that the positive rear lens group further includes a further positive lens element, and that the cemented lens elements and the further lens element are arranged in this order from the object.

Still further, in the first and aspects of the present invention, the wide-angle lens system can further satisfy the following condition:

$$-15 < fF/f < -1.5 \quad (4)$$

wherein fF designates the focal length of the negative front lens group; and f designates the focal length of the entire wide-angle lens system.

According to a third aspect of the present invention, there is provided a wide-angle lens system including a negative front lens group, a diaphragm and a positive rear lens group, in this order from an object.

The negative front lens group includes a negative first sub-lens group and a positive second sub-lens group, in this order from the object.

The wide-angle lens system satisfies the following conditions:

$$-15 < fF/f < -1.5 \quad (4)$$

$$-2.0 < fla/f < -0.5 \quad (5)$$

wherein fF designates the focal length of the negative front lens group;

f designates the focal length of the entire wide-angle lens system;

fla designates the focal length of the negative first sub-lens group; and f designates the focal length of the entire wide-angle lens system.

The wide-angle lens system according to the third aspect of the present invention preferably satisfies the following condition:

$$0.7 < f/fR < 1.1 \quad (2)$$

wherein f designates the focal length of the entire wide-angle lens system; and fR designates the focal length of the positive rear lens group.

The wide-angle lens system according to the third aspect of the present invention preferably satisfies the following condition:

$$-0.8 < fla/flb < -0.2 \quad (1)$$

wherein fla designates the focal length of the negative first sub-lens group; and flb designates the focal length of the positive second sub-lens group.

It is preferable that the positive rear lens group of the third aspect of the present invention includes a positive lens element, a negative lens element, a positive lens element and a positive lens element, in this order from the object, and that the positive lens element, the negative lens element and the positive lens element which are closer to the diaphragm are cemented to each other.

Furthermore, in the first to third aspects of the present invention, it is preferable that the negative first sub-lens group include a positive first lens element having a convex surface facing toward the object and a negative second lens element, in this order from the object, and that the positive second sub-lens group include a negative third lens element having a convex surface facing toward the object and a positive fourth lens element, in this order from the object.

It is preferable that the negative third lens element and the positive fourth lens element be cemented to each other, and that an aspherical surface is formed in the final lens element of the positive rear lens group.

In the above wide-angle lens system, a focusing operation is preferably performed by moving the negative front lens group and the positive rear lens group by different distances respectively; and the wide-angle lens system preferably satisfies the following condition:

$$0.7 < X1/X2 < 0.94 \quad (6)$$

wherein

X1 designates a travelling distance of the negative front lens group upon focusing; and X2 designates a travelling distance of the positive rear lens group upon focusing.

The present disclosure relates to subject matters contained in Japanese Patent Application Nos. 2006-47933 and 2006-47942 (both filed on Feb. 24, 2006) which are expressly incorporated herein in their entireties.

BRIEF DESCRIPTION OF THE DRAWINGS

The present invention will be discussed below in detail with reference to the accompanying drawings, in which:

FIG. 1 is a lens arrangement of the wide-angle lens system according to a first embodiment of the present invention;

FIGS. 2A, 2B, 2C, 2D and 2E show aberrations occurred in the lens arrangement shown in FIG. 1;

FIG. 3 is a lens arrangement of the wide-angle lens system according to a second embodiment of the present invention;

FIGS. 4A, 4B, 4C, 4D and 4E show aberrations occurred in the lens arrangement shown in FIG. 3;

FIG. 5 is a lens arrangement of the wide-angle lens system according to a third embodiment of the present invention;

FIGS. 6A, 6B, 6C, 6D and 6E show aberrations occurred in the lens arrangement shown in FIG. 5;

FIG. 7 is a lens arrangement of the wide-angle lens system according to a fourth embodiment of the present invention;

FIGS. 8A, 8B, 8C, 8D and 8E show aberrations occurred in the lens arrangement shown in FIG. 7;

FIG. 9 is a lens arrangement of the wide-angle lens system according to a fifth embodiment of the present invention;

FIGS. 10A, 10B, 10C, 10D and 10E show aberrations occurred in the lens arrangement shown in FIG. 9;

FIG. 13 is a lens arrangement of the wide-angle lens system according to a seventh embodiment of the present invention;

FIGS. 14A, 14B, 14C, 14D and 14E show aberrations occurred in the lens arrangement shown in FIG. 13;

FIG. 17 is a lens arrangement of the wide-angle lens system according to a ninth embodiment of the present invention;

FIGS. 18A, 18B, 18C, 18D and 18E show aberrations occurred in the lens arrangement shown in FIG. 17;

DESCRIPTION OF THE PREFERRED EMBODIMENTS

Figure 11:
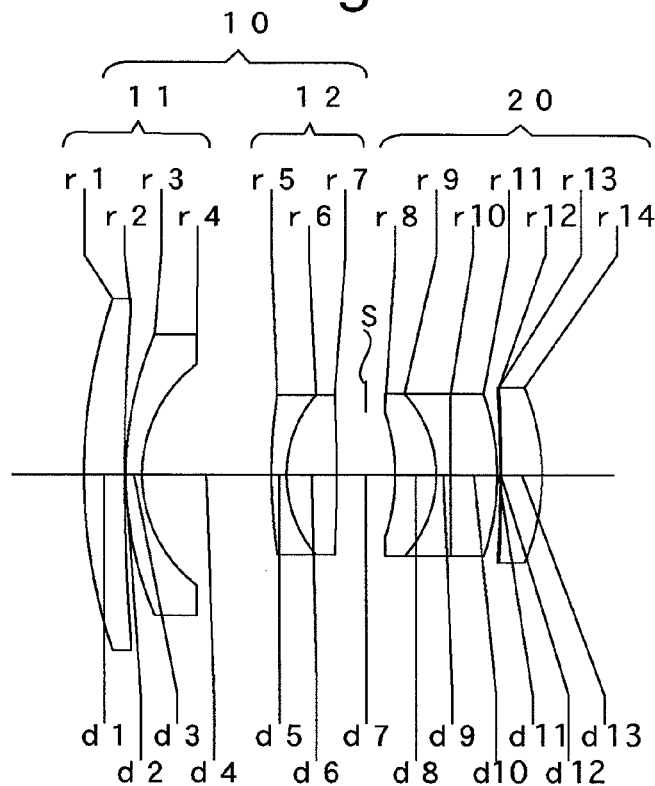
FIG. 11 is a lens arrangement of the wide-angle lens system according to a sixth embodiment of the present invention.
Figures 12A, 12B, 12C, 12D, 12E:
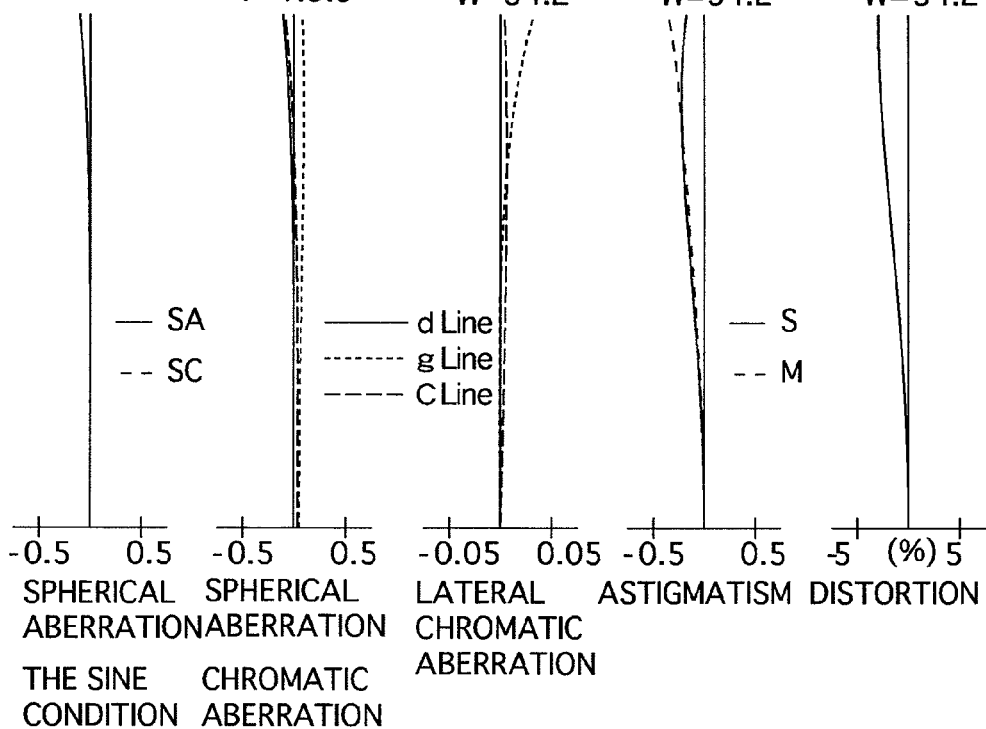
FIGS. 12A, 12B, 12C, 12D and 12E show aberrations occurred in the lens arrangement shown in FIG. 11.

The wide-angle lens system of the present invention, as shown in the embodiments of FIGS. 1, 3, 5, 7, 9, 11, 13, 15, 17 and 19 includes a negative front lens group 10, a diaphragm S and a positive rear lens group 20, in this order from the object.

The negative front lens group 10 is constituted by four lens elements; and the four lens elements are divided into a negative first sub-lens group 11 and a positive second sub-lens group 12 which are separated at a maximum distance therebetween, in this order from the object. Moreover, the negative first sub-lens group 11 and the positive second sub-lens group 12 respectively include a positive lens element and a negative lens element.

More specifically, in all the embodiments, the negative first sub-lens group 11 is constituted by a positive first lens element having a convex surface facing toward the object and a negative second lens element, in this order from the object; and the positive second sub-lens group 12 is constituted by a negative third lens element having a convex surface facing toward the object and a positive fourth lens element, in this order from the object. The negative third lens element and the positive fourth lens element are cemented to each other; and the combined refractive power of the negative third lens element and the positive fourth lens element is positive.

The positive rear lens group 20 includes a positive fifth lens element and a negative sixth lens element, a positive seventh lens element having a convex surface facing toward the image, and a positive eighth lens element, in this order from the object.

The positive fifth lens element, the negative sixth lens element and the positive seventh lens element are cemented to each other. An aspherical surface is formed on the object-side surface of the positive eighth lens element.

A retrofocus lens system generally achieves a back focal distance which is longer than the focal length of the entire lens system. Consequently, the refractive power distribution is asymmetrical with respect to the diaphragm. Accordingly, if an attempt is made to shorten the entire lens system, while the necessary back focal distance is maintained, the correcting of aberrations such as distortion, astigmatism and spherical aberration, etc., becomes difficult.

The negative front lens group is constituted by a plurality of lens elements including at least one positive lens element in order to reduce the occurrence of distortion therein. On the other hand, since the refractive power of the front lens group as a whole is negative, it is understood that at least one negative lens element is provided therein; accordingly, the correcting of astigmatism, distortion and chromatic aberration can be performed.

In order to correct aberrations (particularly, chromatic aberration) more suitably, there is provided cemented lens elements having a positive lens element and a negative lens element, and the refractive power of the entire cemented lens elements is positive.

Furthermore, by providing a relatively thick positive lens element in the vicinity of the object-side of the diaphragm, distortion can be adequately corrected.

In the positive rear lens group 20, in order to correct spherical aberration which occurs in the entire wide-angle lens system, while an influence of spherical aberration to off-axis aberrations is maintained as minimum as possible, at least one negative lens element which generates negative spherical aberration is provided.

In order to reduce the occurrence of spherical aberration and coma, at least three positive lens elements are provided in the positive rear lens group 20.

By providing a positive lens element on each side of the negative lens element (of the positive rear lens group 20), and by bonding these three lens elements to constitute a unit of cemented lens elements, spherical aberration of higher order can be adequately corrected.

The most preferable lens arrangement of the positive rear lens group 20 is that a positive lens element, a negative lens element, a positive lens element and a positive lens element, in this order from the object, and that the three lens elements (counted) from the diaphragm S are cemented to each other. By cementing these object-side three lens elements in the above four-lens-element arrangement, aberrations of higher order can be reduced. The lens arrangement of the positive rear lens group 20 is suitable for the correcting of spherical aberration and coma over the entire image plane.

In the positive rear lens group 20, the object-side surface of the final (eighth) lens element is provided with an aspherical surface. Consequently, the correcting of spherical aberration and coma can be made adequately.

The aspherical surface can be formed either on the object-side surface or the image-side surface of the final (eighth) lens element of the positive rear lens group 20. Here, note that in the case where the aspherical surface is formed as a compound resin layer (so as to constitute a hybrid lens element), the compound-resin-layer aspherical surface is preferably provided on the object-side surface of the final (eighth) lens element of the positive rear lens group 20

In regard to an aspherical surface, it would be possible to provide an aspherical surface in the negative front lens group 10; however, the correcting of coma becomes impossible, and the production costs of the aspherical surface become higher, since the negative front lens group 10 has a larger diameter than that of the positive rear lens group 20, though the correcting of field curvature and astigmatism is possible by the aspherical surface in the negative front lens group 10.

Condition (1) specifies the ratio of the focal length of the negative first sub-lens group 11 to that of the positive second sub-lens group 12 of the negative front lens group 10, and is for correcting field curvature in particular, i.e., condition (1) is for the refractive power distribution over the negative first sub-lens group 11 and the positive second sub-lens group 12.

If fIa/fIb exceeds the upper limit of condition (1), field curvature occurs in the negative direction.

If fIa/fIb exceeds the lower limit of condition (1), field curvature occurs in the positive direction.

As an alternative, if the upper limit of condition (1) is set to −0.25, and if the lower limit thereof is set to −0.75 (i.e., −0.75<fIa/fIb<−0.25 . . . (1')), the more improved correction of field curvature can be attained.

Condition (2) specifies the refractive power of the positive rear lens group 20.

If the positive refractive power of the positive rear lens group 20 becomes stronger to the extent that f/fR exceeds the upper limit of condition (2), it becomes difficult to correct spherical aberration.

If the positive refractive power of the positive rear lens group 20 becomes weaker to the extent that f/fR exceeds the lower limit of condition (2), astigmatism worsens (increases), and the correcting thereof becomes difficult.

As an alternative, if the upper limit of condition (2) is set to 1.0 (i.e., 0.7<f/fR<1.0 . . . (2')), the overall length of the wide-angle lens system can be maintained sufficiently shorter.

Condition (3) specifies the distance between the negative front lens group 10 and the positive rear lens group 20.

If d/f exceeds the upper limit of condition (3), the overall length of the wide-angle lens system becomes longer, and miniaturization thereof becomes difficult.

If d/f exceeds the lower limit of condition (3), the correcting of field curvature and astigmatism becomes difficult.

As an alternative, it is more preferable to set the upper limit of condition (3) to 0.25 (i.e., 0.1<d/f<0.25 . . . (3')).

Condition (4) specifies the refractive power of the negative front lens group 10.

If the negative refractive power of the negative front lens group 10 becomes stronger to the extent that fF/f exceeds the upper limit of condition (4), the incident-angle of a bundle of off-axis light rays to the positive rear lens group 20 becomes larger. Consequently, fluctuations of spherical aberration becomes undesirably larger, If the negative refractive power of the negative front lens group 10 becomes weaker to the extent that fF/f exceeds the lower limit of condition (4), spherical aberration and coma occurred in the positive rear lens group 20 cannot suitably be corrected.

As an alternative, if the lower limit of condition (4) is set to −10, and if the upper limit thereof is set to −5.0 (i.e., −10<fF/f<−5.0 . . . (4')), the more improved correction of aberrations can be attained.

Condition (5) specifies the refractive power of the negative first sub-lens group 11 of the negative front lens group 10. Namely, condition (5) is for adequately correcting aberrations, while both further miniaturization and a longer back focal distance are attained.

If the negative refractive power of the negative first sub-lens group 11 becomes stronger to the extent that fIa/f exceeds the upper limit of condition (5), the correcting of astigmatism and field curvature becomes difficult, while it is advantageous for both further miniaturization and for securing a longer back focal distance.

If the negative refractive power of the negative first sub-lens group 11 becomes weaker to the extent that f1a/f exceeds the lower limit of condition (5), the overall length of the wide-angle lens system tends to be longer to secure a longer back focal distance.

If an attempt is made to shorten the overall length of the wide-angle lens system with f1a/f exceeding the lower limit of condition (5), a negative refractive power has to be distributed to the positive second sub-lens group 12. However, in the case where the positive second sub-lens group 12 has a negative refractive power, the correcting of astigmatism and field curvature occurred in the negative first sub-lens group 11 cannot be performed, so that sufficient optical performance of the wide-angle lens system cannot be attained.

As an alternative, if the lower limit of condition (5) is set to −1.0, and if the upper limit thereof is set to −0.5 (i.e., −1.0<f1a/f<−0.5 . . . (5')), the more improved correction of aberrations can be attained.

The negative first sub-lens group 11 preferably employs the two-lens-element arrangement, i.e., a positive lens element and a negative lens element, in this order from the object.

If the negative first sub-lens group 11 is constituted by a single negative lens element, the correcting of distortion becomes impossible.

Moreover, if the negative first sub-lens group 11 is constituted by a negative lens element and a positive lens element, in this order from the object, the lens-thickness of the negative first sub-lens group 11 increases, and an increase of such a lens-thickness is disadvantageous for achieving the shorter (thinner) wide-angle lens system, while the correcting of distortion is possible.

In the case where the positive second sub-lens group 12 is constituted by a negative lens element and a positive lens element, in this order from the object, field curvature, astigmatism, chromatic aberration and spherical aberration can be adequately corrected. Furthermore, by bonding these negative and positive lens elements, spherical aberration of higher order can be reduced, and the lens-diameter can be made smaller. Namely, the front lens group 10 as a whole has the negative refractive power; and therefore the arrangement of the negative first sub-lens group 11 and the positive second sub-lens group 12 is employed for the purpose of correcting aberrations. More specifically, the negative first sub-lens group 11 is constituted by the positive lens element and the negative lens element, the arrangement of which is advantageous for correcting distortion, though astigmatism is undercorrected.

Then, in the case where an attempt is made to correct undercorrected astigmatism by the positive second sub-lens group 12, if the positive second sub-lens group 12 is constituted by a single positive lens element only, spherical aberration and coma undesirably occur. Therefore by forming the positive second sub-lens group 11 as cemented lens elements having the negative lens element and the positive lens element, the correcting of astigmatism can be adequately carried out, while the occurrence of spherical aberration and coma can be reduced.

Condition (6) specifies the ratio of the traveling distance of the negative front lens group 10 to that of the positive rear lens group 20 in the case where the floating focusing system is employed.

The floating focusing system in which the traveling distance of a front lens group is made different from that of a rear lens group upon focusing has been known to be effective in correcting field curvature occurred when an object at a closer distance is photographed.

If X1/X2 exceeds the upper limit of condition (6), field curvature is undercorrected.

If X1/X2 exceeds the lower limit of condition (6), field curvature is overcorrected.

Here, note that the floating focusing system can either employ a linear floating in which the ratio of the traveling distance of a front lens group to that of a rear lens group is constant, or a non-linear floating the above ratio of the traveling distance of a front lens group to that of a rear lens group is variable.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, and the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

The tables, FNO. designates the F-number, f designates the focal length of the entire wide-angle lens system, W designates the half angle-of-view (°), fB designates the back focal distance, r designates the radius of curvature, d designates the lens-element thickness or a distance between lens elements (lens groups), $N_d$ designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}\ldots$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

Embodiment 1

FIG. 1 is the lens arrangement of the wide-angle lens system according to the first embodiment of the present invention. FIGS. 2A through 2E show aberrations occurred in the lens arrangement shown in FIG. 1.

Table 1 shows the numerical data of the first embodiment when an object at infinity is in an in-focus state.

The wide-angle lens system of the first embodiment includes a negative front lens group 10, a diaphragm S and a positive rear lens group 20, in this order from the object.

The negative front lens group 10 includes a negative first sub-lens group 11 and a positive sub-lens group 12, in this order from the object, which are separated at the maximum distance therebetween.

The negative first sub-lens group 11 includes a positive meniscus lens element (a positive first lens element) having the convex surface facing toward the object and a negative meniscus lens element (a negative second lens element) having the convex surface facing toward the object, in this order from the object.

The positive second sub-lens group 12 includes cemented lens elements having a negative meniscus lens element (negative third lens element) having the convex surface facing toward the object and a positive meniscus lens element (positive fourth lens element) having the convex surface facing toward the object, in this order from the object. Note that the positive fourth lens element is thickest lens element in the entire wide-angle lens system.

The positive rear lens group 20 includes cemented lens elements having a positive meniscus lens element having the convex surface facing toward the image (a positive fifth lens element), a negative planoconcave lens element (a negative sixth lens element) having the concave surface facing toward the object and a positive planoconvex lens element (a positive seventh lens element) having the convex surface facing toward the image, and a positive meniscus lens element (a positive eighth lens element) having the convex surface toward the image, in this order from the object. Note that the combined refractive power of the cemented lens elements (the positive fifth lens element, the negative sixth lens element and the positive seventh lens element) is negative, and that an aspherical layer is formed on the object-side surface of the positive eighth lens element.

The diaphragm S is provided 2.00 behind the positive second sub-lens group 12 (surface No. 7).

Floating Focusing Data:

|  | Photographic Magnification | |
|---|---|---|
|  | $-1/10$ | $-1/4$ |
| Traveling Distance X1 of First Lens Group | 2.045 | 5.146 |
| Traveling Distance X2 of Second Lens Group | 2.216 | 5.575 |
| X1/X2 | 0.92 | 0.92 |

Embodiment 2

FIG. 3 is the lens arrangement of the wide-angle lens system according to the second embodiment of the present invention. FIGS. 4A through 4E show aberrations occurred in the lens arrangement shown in FIG. 3.

Table 2 shows the numerical data of the second embodiment when an object at infinity is in an in-focus state.

The positive second sub-lens group 12 includes a cemented lens having a negative meniscus lens element (the negative third lens element) having the convex surface facing toward the object and a positive biconvex lens element (the positive fourth lens element), in this order from the object.

The combined refractive power of the cemented lens elements (the positive fifth lens element, the negative sixth lens element and the positive seventh lens element) in the positive rear lens group 20 is negative.

The remaining lens arrangement of the second embodiment is the same as that of the first embodiment.

The diaphragm S is provided 2.06 behind the positive second sub-lens group 12 (surface No. 7).

TABLE 1

F = 1:3.3
f = 21.60
W = 35.0
fB = 36.70

| Surf. No. | r | d | Nd | ν |
|---|---|---|---|---|
| 1 | 32.486 | 3.62 | 1.69680 | 55.5 |
| 2 | 113.238 | 0.10 | — | — |
| 3 | 20.902 | 1.10 | 1.80400 | 46.6 |
| 4 | 8.178 | 6.75 | — | — |
| 5 | 36.561 | 1.24 | 1.77250 | 49.6 |
| 6 | 8.178 | 5.67 | 1.69895 | 30.1 |
| 7 | 6403.341 | 4.00 | — | — |
| 8 | −20.013 | 2.59 | 1.72916 | 54.7 |
| 9 | −8.600 | 1.00 | 1.74077 | 27.8 |
| 10 | ∞ | 2.37 | 1.62299 | 58.2 |
| 11 | −19.142 | 0.10 | — | — |
| 12* | −65.119 | 0.10 | 1.52972 | 42.7 |
| 13 | −69.548 | 2.68 | 1.77250 | 49.6 |
| 14 | −14.886 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.41055 \times 10^{-4}$ | $-0.12824 \times 10^{-7}$ |

TABLE 2

F = 1:3.3
f = 21.60
W = 35.0
fB = 36.70

| Surf. No. | r | d | Nd | ν |
|---|---|---|---|---|
| 1 | 37.756 | 2.80 | 1.70469 | 55.3 |
| 2 | 157.205 | 0.10 | — | — |
| 3 | 24.898 | 1.10 | 1.83481 | 42.7 |
| 4 | 9.600 | 9.00 | — | — |
| 5 | 39.478 | 1.00 | 1.71300 | 53.9 |
| 6 | 8.945 | 3.31 | 1.71918 | 28.7 |
| 7 | −131.430 | 4.10 | — | — |
| 8 | −13.854 | 2.79 | 1.71192 | 54.5 |
| 9 | −8.792 | 1.01 | 1.80518 | 25.4 |
| 10 | ∞ | 3.05 | 1.60062 | 62.4 |
| 11 | −17.049 | 0.27 | — | — |
| 12* | −136.300 | 0.10 | 1.52972 | 42.7 |
| 13 | −126.000 | 2.68 | 1.77250 | 49.6 |
| 14 | −15.494 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.47288 \times 10^{-4}$ | $-0.91638 \times 10^{-8}$ |

Floating Focusing Data:

|  | Photographic Magnification | |
|---|---|---|
|  | −1/10 | −1/4 |
| Traveling Distance X1 of First Lens Group | 1.909 | 4.779 |
| Traveling Distance X2 of Second Lens Group | 2.164 | 5.418 |
| X1/X2 | 0.88 | 0.88 |

Embodiment 3

FIG. 5 is the lens arrangement of the wide-angle lens system according to the third embodiment of the present invention. FIGS. 6A through 6E show aberrations occurred in the lens arrangement shown in FIG. 5.

Table 3 shows the numerical data of the third embodiment when an object at infinity is in an in-focus state.

The basic lens arrangement of the third embodiment is the same as that of the first embodiment.

The combined refractive power of the cemented lens elements (the positive fifth lens element, the negative sixth lens element and the positive seventh lens element) in the positive rear lens group 20 is negative.

The diaphragm S is provided 2.09 behind the positive second sub-lens group 12 (surface No. 7).

TABLE 3

F = 1:3.3
f = 21.60
W = 35.0
fB = 36.70

| Surf. No. | r | d | Nd | ν |
|---|---|---|---|---|
| 1 | 30.147 | 2.80 | 1.69680 | 55.5 |
| 2 | 103.268 | 0.10 | — | — |
| 3 | 21.829 | 1.10 | 1.83399 | 42.3 |
| 4 | 8.521 | 7.22 | — | — |
| 5 | 36.638 | 1.14 | 1.77617 | 48.6 |
| 6 | 8.104 | 6.00 | 1.70992 | 29.0 |
| 7 | 2239.858 | 4.17 | — | — |
| 8 | −19.436 | 2.70 | 1.72916 | 54.7 |
| 9 | −8.327 | 1.00 | 1.72822 | 27.4 |
| 10 | ∞ | 2.30 | 1.69513 | 54.4 |
| 11 | −21.099 | 0.10 | — | — |
| 12* | −66.857 | 0.10 | 1.52972 | 42.7 |
| 13 | −57.062 | 2.59 | 1.77250 | 49.6 |
| 14 | −15.214 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | −0.41950 × 10$^{-4}$ | −0.10897 × 10$^{-7}$ |

Floating Focusing Data:

|  | Photographic Magnification | |
|---|---|---|
|  | −1/10 | −1/4 |
| Traveling Distance X1 of First Lens Group | 2.033 | 5.112 |
| Traveling Distance X2 of Second Lens Group | 2.21 | 5.557 |
| X1/X2 | 0.92 | 0.92 |

Embodiment 4

FIG. 7 is the lens arrangement of the wide-angle lens system according to the fourth embodiment of the present invention. FIGS. 8A through 8E show aberrations occurred in the lens arrangement shown in FIG. 7.

Table 4 shows the numerical data of the fourth embodiment when an object at infinity is in an in-focus state.

The basic lens arrangement of the fourth embodiment is the same as that of the second embodiment.

The combined refractive power of the cemented lens elements (the positive fifth lens element, the negative sixth lens element and the positive seventh lens element) in the positive rear lens group 20 is positive.

The diaphragm S is provided 1.50 behind the positive second sub-lens group 12 (surface No. 7).

TABLE 4

F = 1:3.3
f = 21.60
W = 35.0
fB = 36.70

| Surf. No. | r | d | Nd | ν |
|---|---|---|---|---|
| 1 | 34.013 | 3.00 | 1.65123 | 50.7 |
| 2 | 140.405 | 0.10 | — | — |
| 3 | 19.461 | 1.10 | 1.88300 | 40.8 |
| 4 | 8.178 | 6.91 | — | — |
| 5 | 61.280 | 1.12 | 1.62216 | 57.4 |
| 6 | 8.991 | 3.81 | 1.68167 | 29.9 |
| 7 | −70.997 | 3.50 | — | — |
| 8 | −17.683 | 4.64 | 1.71853 | 37.9 |
| 9 | −8.600 | 1.00 | 1.80474 | 25.3 |
| 10 | ∞ | 2.71 | 1.60388 | 60.6 |
| 11 | −14.186 | 0.10 | — | — |
| 12* | −72.209 | 0.10 | 1.52972 | 42.7 |
| 13 | −63.226 | 2.37 | 1.77250 | 49.7 |
| 14 | −18.311 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | −0.29180 × 10$^{-4}$ | −0.79849 × 10$^{-7}$ |

Floating Focusing Data:

|  | Photographic Magnification | |
|---|---|---|
|  | $-1/10$ | $-1/4$ |
| Traveling Distance X1 of First Lens Group | 1.954 | 4.899 |
| Traveling Distance X2 of Second Lens Group | 2.172 | 5.444 |
| X1/X2 | 0.90 | 0.90 |

Embodiment 5

FIG. 9 is the lens arrangement of the wide-angle lens system according to the fifth embodiment of the present invention. FIGS. 10A through 10E show aberrations occurred in the lens arrangement shown in FIG. 9.

Table 5 shows the numerical data of the fifth embodiment when an object at infinity is in an in-focus state.

The basic lens arrangement of the fifth embodiment is the same as that of the second embodiment.

The combined refractive power of the cemented lens elements (the positive fifth lens element, the negative sixth lens element and the positive seventh lens element) in the positive rear lens group 20 is positive.

The diaphragm S is provided 1.60 behind the positive second sub-lens group 12 (surface No. 7).

TABLE 5

F = 1:3.3
f = 21.60
W = 35.0
fB = 36.70

| Surf. No. | r | d | Nd | ν |
|---|---|---|---|---|
| 1 | 40.909 | 2.95 | 1.71628 | 53.3 |
| 2 | 145.615 | 0.10 | — | — |
| 3 | 17.264 | 1.10 | 1.88300 | 40.8 |
| 4 | 8.178 | 7.55 | — | — |
| 5 | 72.599 | 1.00 | 1.69106 | 54.3 |
| 6 | 8.991 | 4.97 | 1.70950 | 29.3 |
| 7 | −86.925 | 3.65 | — | — |
| 8 | −19.764 | 3.10 | 1.70629 | 40.6 |
| 9 | −8.600 | 1.16 | 1.81072 | 25.8 |
| 10 | ∞ | 2.92 | 1.61693 | 60.0 |
| 11 | −13.576 | 0.10 | — | — |
| 12* | −61.836 | 0.10 | 1.52972 | 42.7 |
| 13 | −111.342 | 2.57 | 1.77109 | 49.8 |
| 14 | −19.155 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.23835 \times 10^{-4}$ | $-0.87028 \times 10^{-7}$ |

Floating Focusing Data:

|  | Photographic Magnification | |
|---|---|---|
|  | $-1/10$ | $-1/4$ |
| Traveling Distance X1 of First Lens Group | 2.005 | 5.028 |
| Traveling Distance X2 of Second Lens Group | 2.178 | 5.464 |
| X1/X2 | 0.92 | 0.92 |

Embodiment 6

FIG. 11 is the lens arrangement of the wide-angle lens system according to the sixth embodiment of the present invention. FIGS. 12A through 12E show aberrations occurred in the lens arrangement shown in FIG. 11.

Table 6 shows the numerical data of the sixth embodiment when an object at infinity is in an in-focus state.

The basic lens arrangement of the sixth embodiment is the same as that of the first embodiment.

The diaphragm S is provided 2.00 in front the positive rear lens group 20 (surface No. 8).

Furthermore, the floating focusing system in which the traveling distance of a front lens group is made different from that of a rear lens group upon focusing is employed to correct field curvature occurred when an object at a closer distance is photographed.

TABLE 6

F = 1:3.3
f = 21.60
W = 34.2
fB = 36.70

| Surf. No. | r | d | Nd | ν |
|---|---|---|---|---|
| 1 | 37.707 | 2.80 | 1.70000 | 56.5 |
| 2 | 156.586 | 0.10 | — | — |
| 3 | 24.702 | 1.10 | 1.83481 | 42.7 |
| 4 | 9.600 | 8.80 | — | — |
| 5 | 40.676 | 1.00 | 1.71300 | 53.9 |
| 6 | 8.600 | 3.39 | 1.71879 | 29.0 |
| 7 | −109.468 | 4.00 | — | — |
| 8 | −13.645 | 2.84 | 1.73258 | 50.5 |
| 9 | −8.178 | 1.00 | 1.80482 | 25.4 |
| 10 | ∞ | 3.19 | 1.59851 | 59.7 |
| 11 | −16.989 | 0.20 | — | — |
| 12* | −134.928 | 0.10 | 1.52972 | 42.7 |
| 13 | −94.797 | 2.78 | 1.77250 | 49.6 |
| 14 | −15.434 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.47266 \times 10^{-4}$ | $-0.10789 \times 10^{-7}$ |

Floating Focusing Data:

|  | Photographic Magnification | |
|---|---|---|
|  | −1/10 | −1/4 |
| Traveling Distance X1 of First Lens Group | 1.86 | 4.81 |
| Traveling Distance X2 of Second Lens Group | 2.16 | 5.41 |
| X1/X2 | 0.86 | 0.89 |

Embodiment 7

FIG. 13 is the lens arrangement of the wide-angle lens system according to the seventh embodiment of the present invention. FIGS. 14A through 14E show aberrations occurred in the lens arrangement shown in FIG. 13.

Table 7 shows the numerical data of the seventh embodiment when an object at infinity is in an in-focus state.

The positive rear lens group 20 includes cemented lens elements having a positive meniscus lens element (a positive fifth lens element) having the convex surface facing toward the image, a negative biconcave negative lens element (a negative sixth lens element) and a positive biconvex positive lens element (a seventh lens element), and a positive meniscus lens element (a positive eighth lens element) having the convex surface facing toward the image, in this order from the object. Note that an aspherical layer is formed on the object-side surface of the positive eighth lens element.

The remaining lens arrangement of the seventh embodiment is the same as that of the sixth embodiment.

The diaphragm S is provided 1.502 in front the positive rear lens group 20 (surface No. 8).

TABLE 7

F = 1:2.9
f = 21.60
W = 34.2
fB = 36.70

| Surf. No. | r | d | Nd | ν |
|---|---|---|---|---|
| 1 | 31.888 | 2.86 | 1.75593 | 50.7 |
| 2 | 105.492 | 0.25 | — | — |
| 3 | 20.861 | 1.10 | 1.83481 | 42.7 |
| 4 | 8.408 | 6.37 | — | — |
| 5 | 47.737 | 1.00 | 1.72679 | 53.7 |
| 6 | 8.603 | 3.47 | 1.74004 | 30.2 |
| 7 | −103.730 | 3.34 | — | — |
| 8 | −16.632 | 5.00 | 1.77937 | 26.6 |
| 9 | −7.600 | 1.00 | 1.84637 | 24.6 |
| 10 | 60.572 | 3.11 | 1.61999 | 63.7 |
| 11 | −18.267 | 0.20 | — | — |
| 12* | −222.196 | 0.10 | 1.52972 | 42.7 |
| 13 | −226.265 | 3.41 | 1.71300 | 53.9 |
| 14 | −15.007 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.44999 \times 10^{-4}$ | $0.84551 \times 10^{-7}$ |

Floating Focusing Data:

|  | Photographic Magnification | |
|---|---|---|
|  | −1/10 | −1/4 |
| Traveling Distance X1 of First Lens Group | 1.88 | 4.85 |
| Traveling Distance X2 of Second Lens Group | 2.18 | 5.45 |
| X1/X2 | 0.86 | 0.89 |

Embodiment 8

Figure 15:
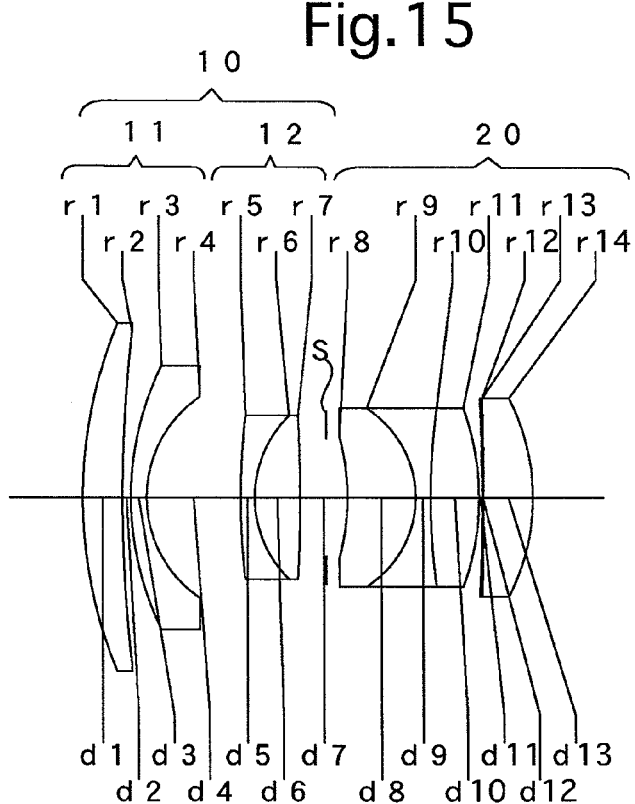
FIG. 15 is a lens arrangement of the wide-angle lens system according to an eighth embodiment of the present invention.
Figures 16A, 16B, 16C, 16D, 16E:
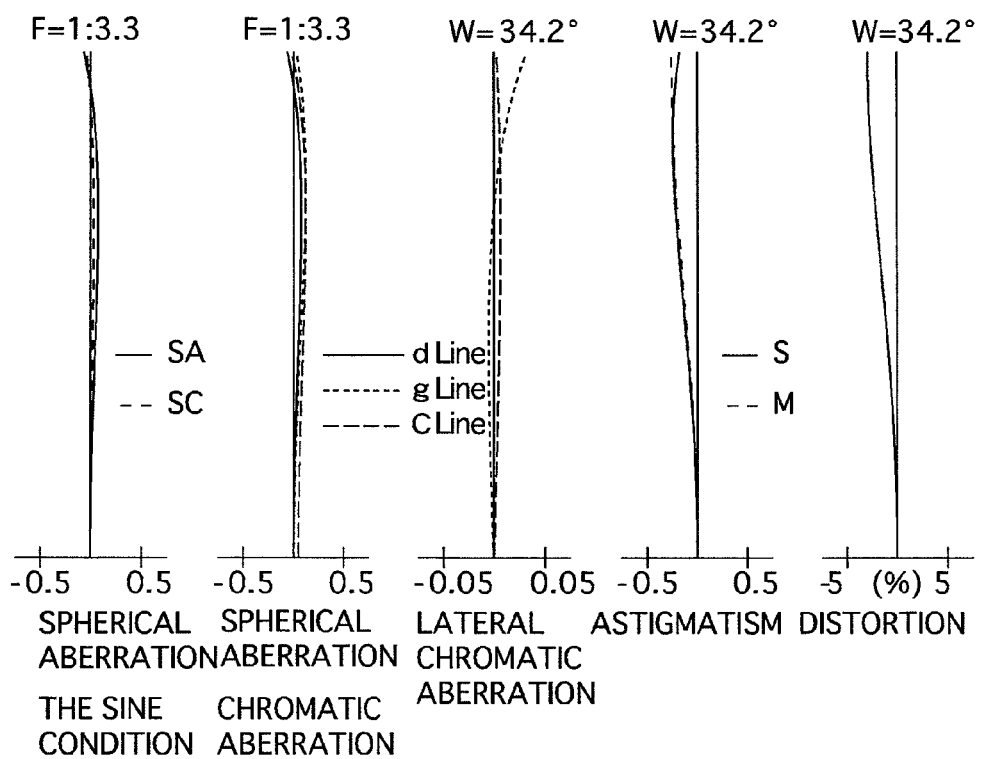
FIGS. 16A, 16B, 16C, 16D and 16E show aberrations occurred in the lens arrangement shown in FIG. 15.

FIG. 15 is the lens arrangement of the wide-angle lens system according to the eighth embodiment of the present invention. FIGS. 16A through 16E show aberrations occurred in the lens arrangement shown in FIG. 15.

Table 8 shows the numerical data of the eighth embodiment when an object at infinity is in an in-focus state.

The remaining lens arrangement of the eighth embodiment is the same as that of the seventh embodiment.

The diaphragm S is provided 1.501 in front the positive rear lens group 20 (surface No. 8).

TABLE 8

F = 1:3.3
f = 21.60
W = 34.2
fB = 36.70

| Surf. No. | r | d | Nd | ν |
|---|---|---|---|---|
| 1 | 31.807 | 2.77 | 1.76435 | 50.1 |
| 2 | 101.901 | 0.58 | — | — |
| 3 | 20.842 | 1.10 | 1.83400 | 42.8 |
| 4 | 8.442 | 6.62 | — | — |
| 5 | 50.370 | 1.00 | 1.71963 | 54.5 |
| 6 | 7.968 | 3.17 | 1.74397 | 31.2 |
| 7 | −104.347 | 3.32 | — | — |
| 8 | −16.220 | 4.71 | 1.76211 | 27.3 |
| 9 | −7.400 | 1.00 | 1.84700 | 25.2 |
| 10 | 46.490 | 3.31 | 1.61945 | 63.7 |
| 11 | −18.228 | 0.20 | — | — |
| 12* | −343.570 | 0.10 | 1.52972 | 42.7 |
| 13 | −265.439 | 3.44 | 1.72882 | 53.3 |
| 14 | −14.962 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $-0.44119 \times 10^{-4}$ | $0.86880 \times 10^{-7}$ |

Floating Focusing Data:

|  | Photographic Magnification | |
|---|---|---|
|  | $-1/10$ | $-1/4$ |
| Traveling Distance X1 of First Lens Group | 1.81 | 4.82 |
| Traveling Distance X2 of Second Lens Group | 2.17 | 5.44 |
| X1/X2 | 0.83 | 0.89 |

Embodiment 9

FIG. 17 is the lens arrangement of the wide-angle lens system according to the ninth embodiment of the present invention. FIGS. 18A through 18E show aberrations occurred in the lens arrangement shown in FIG. 17.

Table 9 shows the numerical data of the ninth embodiment when an object at infinity is in an in-focus state.

The positive rear lens group 20 includes cemented lens elements having a positive meniscus lens element (a positive fifth lens element) having the convex surface facing toward the image, a negative biconcave lens element (a negative sixth lens element) and a positive biconvex lens element (a seventh lens element), and a positive meniscus lens element (a positive eighth lens element) having the convex surface facing toward the image, in this order from the object.

The remaining lens arrangement of the ninth embodiment is the same as that of the seventh embodiment.

The diaphragm S is provided 1.743 in front the positive rear lens group 20 (surface No. 8).

TABLE 9

F = 1:3.3
f = 21.57
W = 34.2
fB = 36.35

| Surf. No. | r | d | Nd | ν |
|---|---|---|---|---|
| 1 | 35.754 | 2.78 | 1.69492 | 57.0 |
| 2 | 140.010 | 0.10 | — | — |
| 3 | 23.976 | 1.10 | 1.83193 | 39.2 |
| 4 | 9.469 | 7.93 | — | — |
| 5 | 46.987 | 1.26 | 1.68797 | 56.9 |
| 6 | 7.310 | 4.14 | 1.70198 | 31.3 |
| 7 | −106.643 | 4.55 | — | — |
| 8 | −13.548 | 2.63 | 1.73800 | 52.3 |
| 9 | −8.675 | 1.00 | 1.78640 | 27.0 |
| 10 | 75.642 | 3.61 | 1.59769 | 61.6 |
| 11 | −15.465 | 0.20 | — | — |
| 12* | −490.224 | 2.66 | 1.77247 | 49.7 |
| 13 | −17.907 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $0.12172 \times 10^{-4}$ | $0.14920 \times 10^{-6}$ |

Floating Focusing Data:

|  | Photographic Magnification | |
|---|---|---|
|  | $-1/10$ | $-1/4$ |
| Traveling Distance X1 of First Lens Group | 1.86 | 4.81 |
| Traveling Distance X2 of Second Lens Group | 2.17 | 5.42 |
| X1/X2 | 0.86 | 0.89 |

Embodiment 10

Figure 19:
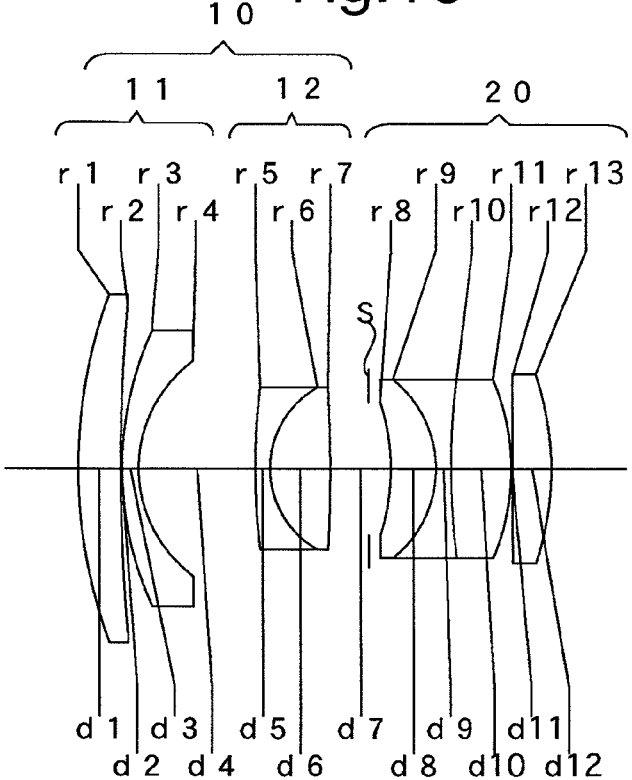
FIG. 19 is a lens arrangement of the wide-angle lens system according to a tenth embodiment of the present invention.
Figures 20A, 20B, 20C, 20D, 20E:
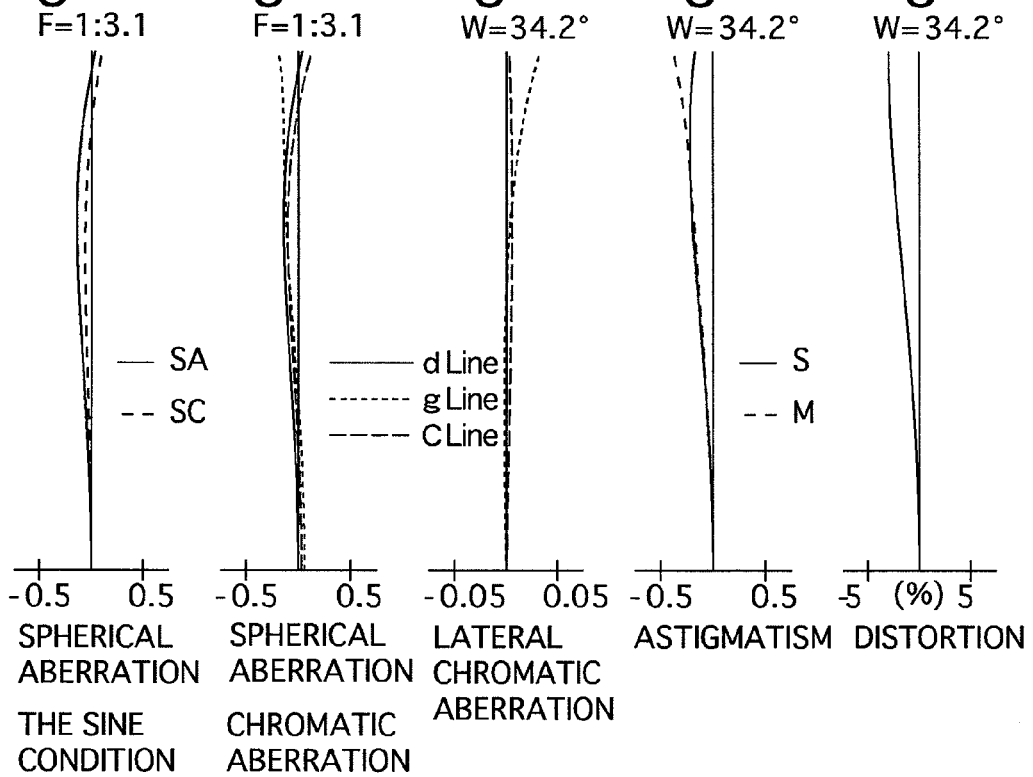
FIGS. 20A, 20B, 20C, 20D and 20E show aberrations occurred in the lens arrangement shown in FIG. 19.

FIG. 19 is the lens arrangement of the wide-angle lens system according to the tenth embodiment of the present invention. FIGS. 20A through 20E show aberrations occurred in the lens arrangement shown in FIG. 19.

Table 10 shows the numerical data of the tenth embodiment when an object at infinity is in an in-focus state.

The basic lens arrangement of the tenth embodiment is the same as that of the ninth embodiment.

The diaphragm S is provided 1.500 in front the positive rear lens group 20 (surface No. 8).

TABLE 10

F = 1:3.1
f = 21.60
W = 34.2
fB = 36.32

| Surf. No. | r | d | Nd | ν |
|---|---|---|---|---|
| 1 | 34.649 | 2.84 | 1.70000 | 56.8 |
| 2 | 133.094 | 0.10 | — | — |
| 3 | 22.840 | 1.10 | 1.83400 | 37.2 |
| 4 | 9.168 | 7.83 | — | — |
| 5 | 45.105 | 1.00 | 1.64999 | 59.2 |
| 6 | 6.297 | 4.08 | 1.67524 | 31.8 |
| 7 | −109.031 | 4.14 | — | — |
| 8 | −14.382 | 3.08 | 1.69929 | 53.8 |
| 9 | −7.688 | 1.03 | 1.77753 | 27.7 |
| 10 | 48.001 | 4.13 | 1.61173 | 63.7 |
| 11 | −15.266 | 0.10 | — | — |
| 12* | −2907.567 | 2.58 | 1.77250 | 44.1 |
| 13 | −19.721 | — | — | — |

The symbol * designates the aspherical surface which is rotationally symmetrical with respect to the optical axis.

Aspherical surface data (the aspherical surface coefficients not indicated are zero (0.00)):

| Surf. No. | K | A4 | A6 |
|---|---|---|---|
| 12 | 0.00 | $0.97910 \times 10^{-5}$ | $0.11649 \times 10^{-6}$ |

Floating Focusing Data:

|  | Photographic Magnification | |
|---|---|---|
|  | $-1/10$ | $-1/4$ |
| Traveling Distance X1 of First Lens Group | 1.88 | 4.72 |
| Traveling Distance X2 of Second Lens Group | 2.17 | 5.42 |
| X1/X2 | 0.87 | 0.87 |

The numerical values of conditions (1) through (6) for the first through tenth embodiments are shown in Table 11.

TABLE 11

|  | Embod. 1 | Embod. 2 | Embod. 3 | Embod. 4 | Embod. 5 |
|---|---|---|---|---|---|
| Cond. (1) | −0.32 | −0.69 | −0.34 | −0.62 | −0.51 |
| Cond. (2) | 0.99 | 0.81 | 0.96 | 0.85 | 0.88 |
| Cond. (3) | 0.19 | 0.19 | 0.19 | 0.16 | 0.17 |
| Cond. (4) | −1.91 | −10.52 | −2.07 | −5.14 | −3.42 |
| Cond. (5) | −1.21 | −1.32 | −1.23 | −1.10 | −1.21 |
|  | Embod. 6 | Embod. 7 | Embod. 8 | Embod. 9 | Embod. 10 |
| Cond. (1) | −0.70 | −0.64 | −0.67 | −0.67 | −0.70 |
| Cond. (2) | 0.81 | 0.89 | 0.89 | 0.81 | 0.84 |
| Cond. (3) | 0.19 | 0.15 | 0.15 | 0.21 | 0.19 |
| Cond. (4) | −12.49 | −5.37 | −6.36 | −7.83 | −9.87 |
| Cond. (5) | −1.33 | −1.26 | −1.29 | −1.35 | −1.33 |

The numerical values of Condition (6) are disclosed in the tables of the first through tenth embodiments.

As can be understood from Table 11, the first through tenth embodiments satisfy conditions (1) through (6). Furthermore, as can be understood from the aberration diagrams, the various aberrations are adequately corrected.

According to the description, a high quality retrofocus wide-angle lens system with the following features can be obtained:

(i) being thin (miniaturized) in the optical axis direction;
(ii) aberrations, specifically coma, distortion and chromatic aberration, are suitably corrected; and
(iii) achieving an angle-of-view of approximately 70°.

What is claimed is:

1. A wide-angle lens system comprises a negative front lens group, a diaphragm and a positive rear lens group, in this order from an object,
   wherein said negative front lens group comprises a negative first sub-lens group and a positive second sub-lens group, in this order from the object;
   wherein said positive rear lens group comprises cemented lens elements having a positive lens element, a negative lens element and a positive lens element; and
   wherein said wide-angle lens system satisfies the following conditions:

$-0.8 < fla/flb < -0.2$ $0.7 < f/fR < 1.1$ wherein
   fla designates the focal length of said negative first sub-lens group;
   flb designates the focal length of said positive second sub-lens group;
   f designates the focal length of the entire wide-angle lens system; and
   fR designates the focal length of said positive rear lens group.

2. A wide-angle lens system comprises a negative front lens group, a diaphragm and a positive rear lens group, in this order from an object,
   wherein said negative front lens group comprises a negative first sub-lens group and a positive second sub-lens group, in this order from the object;
   wherein said positive rear lens group comprises cemented lens elements having a positive lens element, a negative lens element and a positive lens element; and
   wherein said wide-angle lens system satisfies the following conditions:

$-0.8 < fla/flb < -0.2$ $0.1 < d/f < 0.3$ wherein
   fla designates the focal length of said negative first sub-lens group;
   flb designates the focal length of said positive second sub-lens group;
   d designates the axial distance between said negative front lens group and said positive rear lens group; and
   f designates the focal length of the entire wide-angle lens system.

3. The wide-angle lens system according to claim 1, further satisfying the following condition:

$0.1 < d/f < 0.3$ wherein
   d designates the axial distance between said negative front lens group and said positive rear lens group; and
   f designates the focal length of the entire wide-angle lens system.

4. The wide-angle lens system according to claim 1, further satisfying the following condition:

$-15 < fF/f < -1.5$ wherein
   fF designates the focal length of said negative front lens group; and
   f designates the focal length of the entire wide-angle lens system.

5. A wide-angle lens system comprises a negative front lens group, a diaphragm and a positive rear lens group, in this order from an object,
   wherein said negative front lens group comprises a negative first sub-lens group and a positive second sub-lens group, in this order from the object;
   wherein said wide-angle lens system satisfies the following conditions:

$-15 < fF/f < -1.5$ $-2.0 < fla/f < -0.5$ wherein
   fF designates the focal length of said negative front lens group;
   f designates the focal length of the entire wide-angle lens system; and
   fla designates the focal length of said negative first sub-lens group;
   wherein a focusing operation is performed by moving said negative front lens group and said positive rear lens group by different distances respectively; and
   wherein said wide-angle lens system satisfies the following condition:

$0.7 < X1/X2 < 0.94$ wherein
   X1 designates a travelling distance of said negative front lens group upon focusing; and
   X2 designates a travelling distance of said positive rear lens group upon focusing.

6. The wide-angle lens system according to claim 5, further satisfying the following condition:

$0.7 < f/fR < 1.1$ wherein
   f designates the focal length of the entire wide-angle lens system; and fR designates the focal length of said positive rear lens group.

7. The wide-angle lens system according to claim 5, further satisfying the following condition:

$-0.8 < f1a/f1b < -0.2$ wherein f1a designates the focal length of said negative first sub-lens group; and f1b designates the focal length of said positive second sub-lens group.

8. The wide-angle lens system according to claim 5, wherein said positive rear lens group comprises a positive lens element, a negative lens element, a positive lens element and a positive lens element, in this order from the object; and wherein said positive lens element, said negative lens element and said positive lens element which are closer to said diaphragm are cemented to each other.

9. The wide-angle lens system according to claim 1, wherein in said positive rear lens group, said positive lens element, said negative lens element and said positive lens elements of said cemented lens elements are arranged in this order from said diaphragm;

wherein said positive rear lens group further comprises a further positive lens element; and wherein said cemented lens elements and said further positive lens element are arranged in this order from the object.

10. The wide-angle lens system according to claim 1, wherein said negative first sub-lens group comprises a positive first lens element having a convex surface facing toward the object and a negative second lens element, in this order from the object; and wherein said positive second sub-lens group comprises a negative third lens element having a convex surface facing toward the object and a positive fourth lens element, in this order from the object.

11. The wide-angle lens system according to claim 10, wherein said negative third lens element and said positive fourth lens element be cemented to each other.

12. The wide-angle lens system according to claim 1, wherein an aspherical surface is formed in the final lens element of said positive rear lens group.

13. The wide-angle lens system according to claim 1, wherein a focusing operation is performed by moving said negative front lens group and said positive rear lens group by different distances respectively; and wherein said wide-angle lens system satisfies the following condition:

$0.7 < X1/X2 < 0.94$ wherein

X1 designates a travelling distance of said negative front lens group upon focusing; and X2 designates a travelling distance of said positive rear lens group upon focusing.

14. The wide-angle lens system according to claim 2, further satisfying the following condition:

$-15 < fF/f < -1.5$ wherein fF designates the focal length of said negative front lens group; and f designates the focal length of the entire wide-angle lens system.

15. The wide-angle lens system according to claim 2, wherein in said positive rear lens group, said positive lens element, said negative lens element and said positive lens elements of said cemented lens elements are arranged in this order from said diaphragm;

wherein said positive rear lens group further comprises a further positive lens element; and wherein said cemented lens elements and said further positive lens element are arranged in this order from the object.

16. The wide-angle lens system according to claim 2, wherein said negative first sub-lens group comprises a positive first lens element having a convex surface facing toward the object and a negative second lens element, in this order from the object; and wherein said positive second sub-lens group comprises a negative third lens element having a convex surface facing toward the object and a positive fourth lens element, in this order from the object.

17. The wide-angle lens system according to claim 16, wherein said negative third lens element and said positive fourth lens element be cemented to each other.

18. The wide-angle lens system according to claim 2, wherein an aspherical surface is formed in the final lens element of said positive rear lens group.

19. The wide-angle lens system according to claim 2, wherein a focusing operation is performed by moving said negative front lens group and said positive rear lens group by different distances respectively; and wherein said wide-angle lens system satisfies the following condition:

$0.7 < X1/X2 < 0.94$ wherein

X1 designates a travelling distance of said negative front lens group upon focusing; and X2 designates a travelling distance of said positive rear lens group upon focusing.

20. The wide-angle lens system according to claim 5, wherein said negative first sub-lens group comprises a positive first lens element having a convex surface facing toward the object and a negative second lens element, in this order from the object; and wherein said positive second sub-lens group comprises a negative third lens element having a convex surface facing toward the object and a positive fourth lens element, in this order from the object.

21. The wide-angle lens system according to claim 20, wherein said negative third lens element and said positive fourth lens element be cemented to each other.

22. The wide-angle lens system according to claim 5, wherein an aspherical surface is formed in the final lens element of said positive rear lens group.

* * * * *